UNITED STATES PATENT OFFICE.

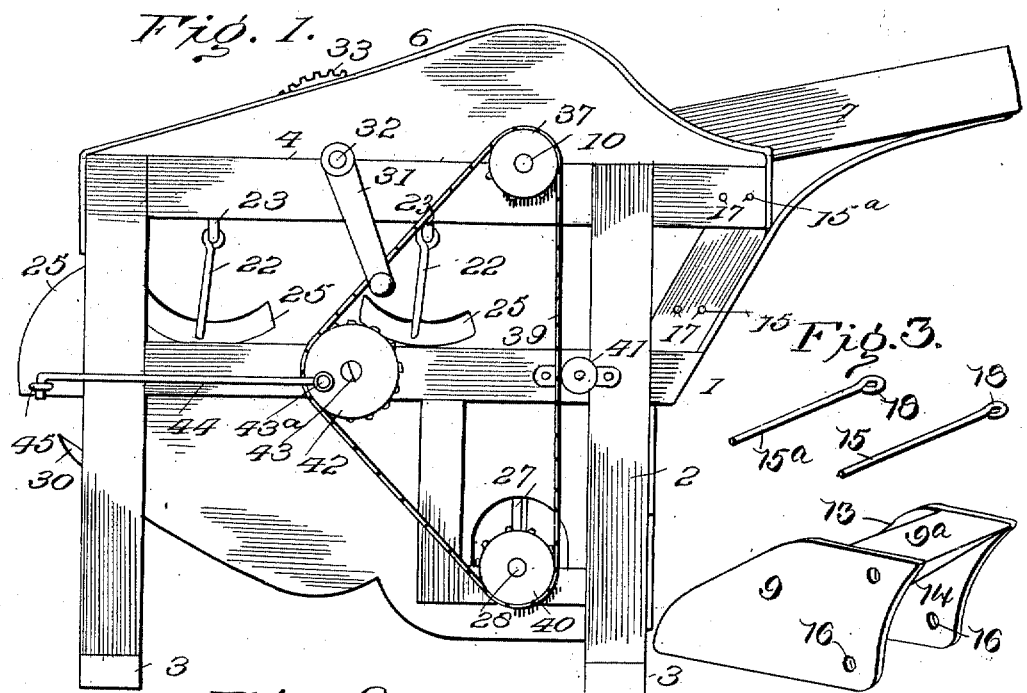

GEORGE LANGEHENNIG, OF GUTHRIE, OKLAHOMA.

THRESHING-MACHINE CONCAVE.

984,094. Specification of Letters Patent. Patented Feb. 14, 1911.

Application filed May 21, 1906. Serial No. 318,079.

*To all whom it may concern:*

Be it known that I, GEORGE LANGEHENNIG, a citizen of the United States, residing at Guthrie, in the county of Logan and State of Oklahoma, have invented certain new and useful Improvements in Threshing-Machine Concaves, of which the following is a specification, reference being had therein to the accompanying drawing.

My invention relates to threshing machine concaves, and it consists in the construction and arrangement of parts, as will be hereinafter described and particularly pointed out in the claim.

Figure 1 is a side elevation of my improved Kafir-corn thresher; Fig. 2 is a vertical longitudinal sectional view through the same; Fig. 3 is a perspective view of the rear or outer side of the concave of the thresher.

Referring to the drawing by numeral, 1 denotes the body or casing of the threshing machine, which is of substantially rectangular form and comprises two sides, each of the latter consisting of two uprights 2 rising from transverse beams or sills 3 and connected by longitudinal bars 4 and metal plates 5. Mounted upon the upper bars 4 is a top or cover section 6 having at one of its ends an inclined chute or feed board 7 upon which the Kafir-corn to be threshed is thrown in order to feed it between the threshing cylinder 8 and the threshing concave portion 9 of the machine.

The cylinder 8 is preferably in the form of a hollow cast metal drum secured upon a transverse shaft 10 mounted in suitable bearings in the body 1. Upon the periphery of the cylinder are transverse rows of teeth 11 to coact with similar rows of teeth 12 on the concave 9. The latter comprises a body portion which is inclined downwardly and rearwardly and at the upper end of the concave is a curved portion as at 9$^b$ whereby when the material is discharged from the feed board 7, it falls down on said curve 9$^b$ and thence on the concave portion from which it passes over the reduced curved end 9$^b$ of the concave. Projecting upwardly and rearwardly from the ends of the body 9$^a$ are flanges 13 adapted to receive the cylinder 8 between them, the cylinder being of a slightly less length than the space between the flanges 13 so that the material passing from the feed board 7 will be confined between the cylinder and concave and thus properly acted upon by the teeth 11, 12. Projecting downwardly and forwardly from the ends of the concave body 9$^a$ are flanges 14 which in effect form continuations of the flanges 13 and have in their lower portions transversely alined apertures 16 for the reception of a transverse rod 15. A similar rod 15$^a$ passes through a transverse opening formed in the upper portion of the body 9$^a$, and both of the rods 15, 15$^a$ are adapted to pass through transversely alined apertures 17 formed in the opposite sides of the body or casing. The apertures 17 are arranged in upper and lower horizontal rows as clearly shown in Fig. 1 and the rods 15, 15$^a$ are bent at one end to provide the hand loops 18 which permit them to be readily removed from and inserted in the alining apertures in the casing and the concave. This construction enables the concave to be readily adjusted in a horizontal plane toward and from the cylinder and also rigidly supports it in an operative position. It furthermore enables the concave to be readily removed for repairs or other purposes.

Mounted within the body 1 beneath the lower discharge end of the concave is a shaking shoe 19 in the bottom 20 of which is arranged a screen or sieve 21. This shoe is mounted for reciprocatory movement by two pairs of suspending links 22 disposed outside of the body and having eyes at their upper ends to engage eyes 23 upon the upper bars 4. The lower ends of these links 22 are formed with hooks 24 to engage apertures in the sides 25 of the shoe, said lower ends being adapted to pass through and swing in segmental slots 26 formed in the side plates 5.

Beneath the shoe 19, at the front end of the body 1, is arranged a cylindrical casing within which is a rotary fan 27. The shaft 28 of this fan extends transversely and is mounted in suitable bearings in the sides of the body 1. The blast from said fan is directed rearwardly beneath the shoe 19 and between the latter and the bottom of the body 1, said bottom being formed by two inwardly and downwardly inclined boards 29, 30 which have their adjacent ends spaced apart to permit of the discharge of the good seed falling through the sieve 21 and the blast of the fan. The waste matter that fails to pass through the sieve is discharged off of the rear end of the shoe, which latter projects slightly beyond the rear end of the body 1, and the light particles that pass through the sieve, but fail to pass through the fan blast, are blown by the latter out of the rear end of the body between the upper and outer end of the bottom board 30 and the bottom of the shoe 19.

The machine is operated by turning a crank handle 31 secured upon one end of a transverse shaft 32 mounted in bearings in the sides of the body 1 and having fixed upon its opposite end a large toothed gear 33. The latter meshes with a gear 34 which rotates upon a stub shaft 35 projecting from the body 1, and which also meshes with a pinion 36 fixed upon one end of the cylinder shaft 10. Upon the opposite end of the shaft 10 is fixed a sprocket-wheel 37 about which is passed a sprocket-chain 39. This chain also passes around a sprocket 40 upon the adjacent end of the fan shaft 28, around an adjustably mounted tightening sprocket 41, and around a sprocket 42 mounted on a stub-shaft 43 projecting from the body 1. Upon the outer face of the wheel 42 is an eccentric wrist pin 43 to which is pivotally connected one end of a connecting rod or pitman 44. The opposite end of the latter is pivotally connected to an arm or stud 45 projecting laterally from the rear outer end of the shoe 19. It will thus be seen that when the crank handle is turned, the gearing and connections just described will rotate the cylinder and the fan, and oscillate the sieve shoe. When these parts are thus operated, and Kafir-corn is fed into the machine, it will be effectively threshed and the seed will drop out of the opening in the pocket or chute formed by the inclined boards 29, 30 of the bottom of the body 1, the waste matter being discharged from the rear end of the latter.

From the foregoing description, taken in connection with the accompanying drawings, the construction, operation, and advantages of the invention will be readily understood without a more extended explanation.

Having thus described my said invention, what I claim as new and desire to secure by Letters Patent of the United States, is—

A threshing machine of the character described comprising a frame having a plurality of upper and lower horizontal rows of transversely alined apertures, a concave mounted on the frame, said concave having a downwardly and rearwardly inclined body portion provided with upwardly and rearwardly projecting flanges, the upper face of the concave having at its upper end an enlarged curved portion, and provided at its lower portion with a tapered curved terminal, said body portion of the concave also having downwardly and forwardly projecting flanges formed by a continuation of the upwardly and rearwardly extending flanges, which are provided at their lower portions with transversely alined apertures, the concave body having in its upper portion a transverse aperture, said upwardly and rearwardly projecting flanges having apertures at their upper ends which register with the apertures in the upper portion of the concave, and removable-supporting rods passing through certain apertures in the sides of the frame and through the apertures of the flanges and also through the apertures in the upper end of the body of the concave, whereby said concave will be removable and also adjustable.

In testimony whereof I hereunto affix my signature in presence of two witnesses.

GEORGE LANGEHENNIG.

Witnesses:
   ROBT. SOHLLURE,
   C. R. HARDGROVE.